US008938145B2

(12) United States Patent
Claisse et al.

(10) Patent No.: US 8,938,145 B2
(45) Date of Patent: Jan. 20, 2015

(54) CONFIGURING OPTICAL LAUNCH POWERS IN OPTICAL FIBER TRANSMISSION LINES

(75) Inventors: Paul Claisse, Freehold, NJ (US); Rene'-Jean Essiambre, Red Bank, NJ (US); Wonsuck Lee, Basking Ridge, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 2048 days.

(21) Appl. No.: 12/008,481

(22) Filed: Jan. 11, 2008

(65) Prior Publication Data

US 2012/0170943 A1 Jul. 5, 2012

Related U.S. Application Data

(62) Division of application No. 11/239,175, filed on Sep. 29, 2005, now Pat. No. 7,379,647.

(51) Int. Cl.
*G02B 6/00* (2006.01)
*H04B 10/293* (2013.01)

(52) U.S. Cl.
CPC .................................. *H04B 10/2935* (2013.01)
USPC ....................................................... 385/123

(58) Field of Classification Search
USPC .......................................................... 385/123
See application file for complete search history.

(56) References Cited

U.S. PATENT DOCUMENTS

| 6,657,779 | B2 * | 12/2003 | Cavaliere et al. .......... 359/341.4 |
| 2004/0234272 | A1 | 11/2004 | Chowdhury et al. .......... 398/147 |
| 2006/0051039 | A1 | 3/2006 | Wei ............................... 385/123 |

\* cited by examiner

*Primary Examiner* — Mike Stahl
(74) *Attorney, Agent, or Firm* — Harness, Dickey & Pierce (57) ABSTRACT

A method includes transmitting optical signals through a heterogeneous sequence of spans of an all-optical transmission line. Each span has an optical transmission fiber connected to an optical amplifier. Each amplifier launches the signals into a sequential remainder of the line. The transmitting includes launching the optical signals into the highest loss fibers with substantially equal average optical launch powers or operating the spans with the highest loss fibers to have substantially equal quality products. The average optical launch powers are substantially equal to the inverse of a sum of $(1-T_j)\gamma_j/[\phi_{NL}\cdot\alpha_j]$ over the highest loss fibers. The parameters $T_j$, $\gamma_j$, and $\alpha_j$ are the respective are, respectively, transmissivity, nonlinear optical coefficient, and loss coefficient of the fiber of the j-th span. The parameter $\phi_{NL}$ is the line's cumulative nonlinear phase shift. Each quality product is the per-span optical signal-to-noise ratio of the associated span times the nonlinear phase shift of the associated span.

7 Claims, 5 Drawing Sheets

DATA SIGNALS

↓  ⌐ 32

TRANSMIT OPTICAL SIGNALS THROUGH A SEQUENCE OF SPANS BY GENERATING IN HIGHEST LOSS OPTICAL TRANSMISSION FIBERS OF THE SEQUENCE AVERAGE OPTICAL LAUNCH POWERS THAT PRODUCE SUBSTANTIALLY EQUAL POWER SUMS, EACH POWER SUM BEING THE AVERAGE LAUNCH OPTICAL POWER IN THE ASSOCIATED FIBER IN DECIBELS PLUS THE AVERAGE OUTPUT OPTICAL POWER FROM THE ASSOCIATED FIBER IN DECIBELS

CONFIGURING OPTICAL LAUNCH POWERS IN OPTICAL FIBER TRANSMISSION LINES

This is a divisional of application Ser. No. 11/239,175 filed on Sep. 29, 2005 now U.S. Pat. No. 7,379,647.

BACKGROUND

1. Field of the Invention

The invention relates to optical fiber transmission lines and methods of making and operating such lines.

2. Discussion of the Related Art

Metropolitan and regional communication infrastructures often evolve and grow during their lifetime. Due to their evolution and growth, these infrastructures often eventually combine different technologies. The combinations of technologies can produce optical fiber transmission lines that are span-wise heterogeneous. In such lines, different ones of the optical transmission fibers produce significantly different optical power losses.

In an optical fiber transmission line, an amplifier couples sequentially related optical transmission fibers. The amplifiers produce adequate optical launch powers to compensate for power losses to optical signals in the immediately earlier optical transmission fiber of the line. Conventional amplification schemes provide substantially the same optical launch power to each optical transmission fiber. The constant value of the optical launch power is often found by modeling a generic homogenous optical fiber transmission line to simulate the real optical fiber transmission line.

Unfortunately, this modeling technique does not guarantee a large enough optical signal-to-noise-ratios (OSNRs) at delivery ends of all optical transmission fibers in a real optical transmission line that differs from the generic homogeneous optical fiber transmission line that was used to model the real line. In such real lines, some optical transmission fibers typically deliver optical signals with OSNRs that are too low for reliable further optical transmission. At the delivery ends of such optical transmission fibers, it is usually necessary to add an optical-to-electrical-to-optical (OEO) converter. The OEO converter can include a device that performs error correction on the resulting electrical signal sequence to reduce transmission error levels. After the error correction, the OEO converter optically transmits a partially or completely corrected data stream of optical signals to the next optical transmission fiber of the optical fiber transmission line. Such OEO conversions are typically costly and undesirable in optical fiber transmission lines.

BRIEF SUMMARY

In one embodiment, a method includes transmitting optical signals through a heterogeneous sequence of spans of an all-optical transmission line. Each span has an optical transmission fiber that is connected to an optical amplifier. Each amplifier launches the optical signals into a sequential remainder of the line. The transmitting step includes launching the optical signals into the highest loss fibers with substantially equal average optical launch powers or operating the spans with the highest loss fibers to have substantially equal quality products. The average optical launch powers are substantially equal to the inverse of a sum of $(1-T_j)\gamma_j/[\phi_{NL} \cdot \alpha_j]$ over the highest loss fibers. The parameters $T_j$, $\gamma_j$, and $\alpha_j$ denote, respectively, the transmissivity, the nonlinear coefficient, and the loss coefficient of the fiber of the j-th span. The parameter $\phi_{NL}$ is the cumulative nonlinear phase shift of the line. Each of the quality products is the per-span optical signal-to-noise ratio of the associated span times the nonlinear phase shift of the associated span.

In another embodiment, a method includes transmitting optical signals through a heterogeneous sequence of optical fiber transmission spans of an all-optical transmission line. Each span has an associated optical transmission fiber connected to an associated optical amplifier. Each amplifier is connected to launch the optical signals into a remainder of the line. The transmitting step includes generating in the highest loss fibers average optical launch powers that produce substantially equal power sums. The power sum of each span is the average optical launch power into the associated fiber plus the average optical power delivered from the associated fiber.

In another embodiment, a method includes transmitting optical signals through a homogeneous sequence of N optical fiber transmission spans of an all-optical transmission line. Each span has an optical transmission fiber connected to an optical amplifier. Each optical amplifier is connected to launch optical signals into a remainder of the line. The transmitting step includes launching the signals in substantially all of the spans with average optical launch powers that are substantially equal to $\phi_{NL} \cdot \alpha/[N \cdot \gamma \cdot (1-T)]$. The parameters T, $\gamma$, and $\alpha$ respectively, denote the fiber's transmissivity, nonlinear coefficient, and loss coefficient. The parameter $\phi_{NL}$ is the cumulative nonlinear phase shift of the line.

The illustrative embodiments are described more fully by the Figures and detailed description. The inventions may, however, be embodied in various forms and are not limited to embodiments described in the Figures and detailed description.

DETAILED DESCRIPTION OF ILLUSTRATIVE EMBODIMENTS

Figure 1:
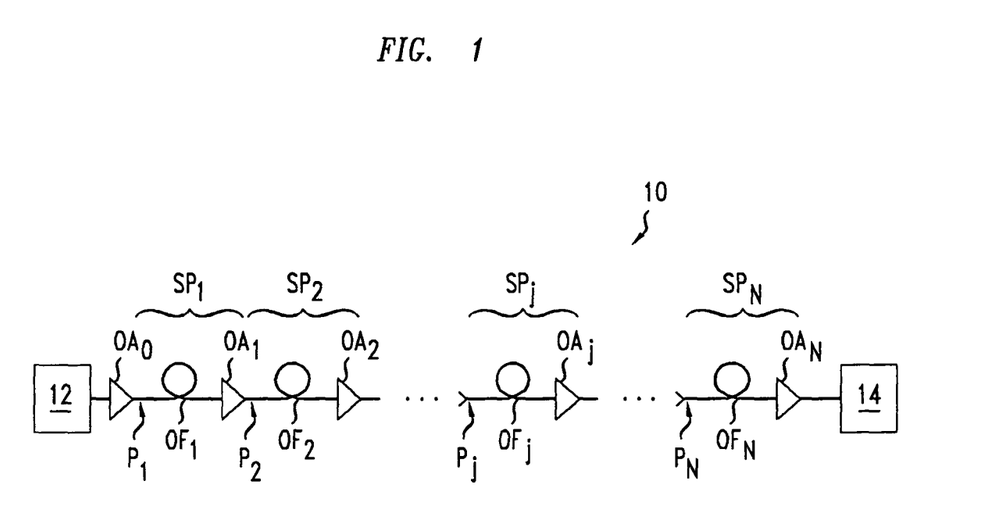
FIG. 1 is a block diagram of an embodiment of an all-optical transmission line in which the optical amplifiers may, e.g., produce average optical launch powers in a substantially optimum constant output power (OCOP) format or a substantially optimum variable output power (OVOP) format.

FIG. 1 shows an all-optical transmission line 10 that includes an optical transmitter 12, an optical receiver 14, and a sequence of optical spans $SP_1, \ldots, SP_N$ that form an optical path between an optical amplifier $OA_0$ at the output of the optical transmitter 12 and an optical amplifier $OA_N$ at the input of the optical receiver 14. Each optical span $SP_1$, $SP_2, \ldots, SP_N$ includes a passive optical transmission fiber $OF_1, OF_2, \ldots, OF_N$ whose output end connects to the input of the optical amplifier $OA_1, OA_2, \ldots, OA_N$ of the same span $SP_1, SP_2, \ldots, SP_N$. The passive optical transmission fibers $OF_1, \ldots, OF_N$ are, e.g., standard single mode fibers (SSMFs), dispersion shifted fibers (DSFs), and/or non-zero dispersion shifted fibers (NZDFs). The output of each optical amplifier $OA_0, \ldots, OA_{N-1}$ connects to the input end of the optical transmission fiber $OF_1, \ldots, OF_N$ of the following span $SP_1, \ldots, SP_N$. The optical amplifiers $OA_0, \ldots, OA_N$ provide the optical powers that launch optical signals into the remainder of the all-optical transmission line 10. In particular, the optical amplifier $OA_0, \ldots, OA_{N-1}$ launch the optical signals into the optical fibers $OF_1, \ldots, OF_N$ of the immediately following spans $SP_1, \ldots, SP_N$, and the optical amplifier $OA_N$ launches the optical signals into the receiver 14. The optical amplifiers $OA_0, \ldots OA_N$ may be, e.g., rare-earth amplifiers such as EDFAs or Raman amplifiers and may perform dispersion compensation, e.g., via dispersion compensating fibers. Exemplary optical amplifiers $OA_0, \ldots OA_N$ also include optical add-drop multiplexers and optical cross-connects.

In the all-optical transmission line 10, optical-to-electrical-to-optical (OEO) converters are absent between the optical transmitter 12 and the optical receiver 14. Thus, the sequence of spans $SP_1, \ldots, SP_N$ and the optical amplifier $OA_0$ do not perform OEO conversions. Indeed, the sequence is substantial in length in that it has at least five of the all-optical spans $SP_1, \ldots, SP_N$, e.g., the sequence may have ten or more of such spans $SP_1 \ldots SP_N$. In some embodiments, the optical transmitter 12 and/or the optical receiver 14 may perform such OEO conversions so that the all-optical transmission line 10 is one all-optical segment of a larger non-all-optical fiber transmission line in which one or more OEO converters (not shown) connect separate all-optical transmission segments.

The optical amplifiers $OA_0, \ldots, OA_N$ may, e.g., be configured to produce average launch powers for optical signals according to a substantially optimum constant output power (OCOP) format or according to a substantially optimum variable output power (OVOP) format. In the OCOP format, each optical amplifier $OA_0, \ldots, OA_N$ produces substantially the same time-averaged and channel-averaged power, $P_{sys}$. For example, each of the average launch powers are in the interval $P_{sys} \pm 2$ dB, i.e., $[0.63 P_{sys}, 1.58 P_{sys}]$, or in the smaller interval $P_{sys} \pm 1$ dB, i.e., $[0.79 P_{sys}, 1.261 P_{sys}]$. In a substantially OCOP format a substantial part of the optical amplifiers $OA_0, \ldots, OA_N$ are configured according to an OCOP format, e.g., at least those amplifiers that launch optical signals into the longest 50%, 70%, or 90% of the optical transmission fibers $OA_0, \ldots, OF_N$. In the OVOP format, different ones of the optical amplifiers $OA_0, \ldots, OA_N$ produce different average optical powers for launching the same stream of received optical data signals.

Some embodiments of all-optical transmission line 10 have heterogeneous sequences of spans. Herein, a heterogeneous sequence has span optical transmission fibers that are not substantially identical. In particular, the optical transmission fibers of some spans have significantly different lengths and/or are formed of optical fiber with different transmission properties.

Due to the substantially OCOP or OVOP format of the configured average optical launch powers, the optical transmission line 10 can be all-optical over a substantial sequence of spans $SP_1, \ldots, SP_N$. For example, the optical transmission line 10 can be implemented on already installed optical transmission lines to reduce the total number of OEO conversions therein without requiring the re-installation of optical transmission fibers.

All-optical transmission line 10 may implement a substantially OCOP or OVOP format to configure optical amplifiers $OA_0, \ldots, OA_N$ to minimize the accumulation of both amplifier stimulated emission (ASE) noise and signal distortions caused by nonlinear optical effects. In heterogeneous optical transmission lines, the substantially OCOP and OVOP formats tend to produce lower bit error rates than in many conventional optical transmission lines. Many of the conventional optical transmission lines are configured to minimize the accumulation of ASE noise without simultaneously limiting the accumulation of the optical signal distortions that are caused by nonlinear optical effects. Other conventional lines are configured to simultaneously minimize both ASE noise and the above-mentioned optical signal distortions based on a fixed optical output power (FOP) format. In the FOP format, average optical launch powers have values that would be approximately optimal for a reference homogeneous all-optical transmission line. Usually, these values are less desirable than the values of the substantially OCOP and OVOP formats, because the reference optical transmission line inadequately models the deployed homogeneous or heterogeneous all-optical transmission line of interest.

To describe the various embodiments of the all-optical transmission line 10, it is useful to introduce several definitions.

First, the definitions include properties that may vary together or individually from span-to-span.

In each optical fiber span $SP_j$, these properties include an average optical launch power, $P_j$; an optical transmissivity, $T_j$; an optical loss, $\Gamma_j$; a nonlinear optical coefficient, $\gamma_j$; a per-channel nonlinear phase shift, $\phi^j_{NL}$; and a per-span optical signal-to-noise ratio, $OSNR_j$. The average optical launch power, $P_j$ is the time-averaged, channel-averaged, per-channel, optical power that is launched into a span's passive optical transmission fiber, $OF_j$. The transmissivity, $T_j$, is the fraction of the average optical launch power that is delivered to the output of the span's passive optical fiber $OF_j$. $T_j$ is approximately equal to $\exp(-\alpha_j L_j)$, i.e., ignoring insertion losses, where $L_j$ and $\alpha_j$ are the respective length and loss coefficient per unit length in the optical fiber $OF_j$. The loss, $\Gamma_j$, is equal to $-10 \cdot \text{Log}_{10}(T_j) \cong 10 \cdot \alpha_j \cdot L_j \cdot \text{Log}_{10}(e)$. The nonlinear optical coefficient, $\gamma_j$, defines the phase shift, $\phi^j_{NL}$, of an optical signal that nonlinear optical effects cause over the passive optical transmission fiber, $OF_j$. The per-channel nonlinear phase shift, $\phi^j_{NL}$, accumulates along the span and is defined by $\phi^j_{NL} = \int_0^{L_j} \gamma_j P_j(z) dz$ where $P_j(z)$ is the optical power at point "z" in the optical fiber, $OF_j$. The per-span optical signal-to-noise ratio, $OSNR_j$ is a time-averaged, per-channel optical signal-to-noise ratio. In particular, $OSNR_j$ in decibels is defined as the ratio of the j-th span's output time-averaged and channel-averaged output signal power over the noise power in a reference bandwidth range $B_{Ref}$ from the optical amplifier $OA_j$ of the j-th span.

For each optical amplifier $OA_j$, these properties include an average optical launch power, $P_{j+1}$, and a noise figure, $F_j$. The average optical launch power, $P_{j+1}$, is the power that the time-averaged per-channel, optical power that the optical amplifier $OA_j$ launches into the remainder of the transmission line 10, e.g., the following span's optical fiber, $OF_{j+1}$. Below, the vector of average optical launch powers, $\{P_1, \ldots, P_N\}$ will often be written as an N-component vector, P. The noise figure, $F_j$, is a characteristic of the optical amplifier $OA_j$ alone. The noise figure, $F_j$, is given as the OSNR at the output of the optical amplifier, $OA_j$, divided by the OSNR at the output of the optical amplifier, $OA_j$, for a shot-noise limited input optical signal.[1]

[1] An alternate definition of the noise figure, $F_j$, of optical amplifier, $OA_j$, is OSNR at the input of the optical amplifier, $OA_j$, divided by the OSNR at the output of the optical amplifier, $OA_j$.

Second, the definitions include constants and properties of the entire all-optical transmission line 10.

These constants and properties include a reference bandwidth, $B_{Ref}$, Planck's constant, h, a selected channel frequency, v, a delivered optical signal-to-noise ratio, $OSNR_{Del}$, a cumulative nonlinear phase shift, $\Phi_{NL}$, and a system nonlinear phase shift, $\Phi_{sys}$. The constant reference bandwidth, $B_{Ref}$, is 0.1 nanometers (nm). The channel frequency, v, is the optical transmission frequency for the channels in the all-optical transmission line 10. The delivered OSNR, $OSNR_{Del}$, is a ratio of the signal power over the noise power that the all-optical transmission line 10 delivers in the reference bandwidth, $B_{Ref}$, to the optical receiver 14 in response to receiving a non-shot limited input optical signal power. For such input optical signal powers, the delivered OSNR is approximately given by:

$$1/OSNR_{Del} = \sum_{j=1}^{N} 1/OSNR_j = \sum_{j=1}^{N} (hvB_{Ref}F_j)/(T_jP_j).$$

The value of $OSNR_{Del}$ provides a measure of cumulative ASE noise over the entire all-optical transmission line 10. The cumulative nonlinear phase shift, $\phi_{NL}$, is the sum of optical phase shifts, $\phi^j_{NL}$, produced by nonlinear effects in the sequence of spans $SP_1, \ldots, SP_N$ of the all-optical transmission line 10. If splice losses are ignored, the cumulative nonlinear optical phase shift, $\phi_{NL}$, is approximately given by:

$$\phi_{NL} = \sum_{j=1}^{N} \phi^j_{NL} = \sum_{j=1}^{N} \left(\frac{\gamma_j}{\alpha_j}\right) P_j (1 - T_j).$$

The value of $\phi_{NL}$ provides a measure of optical signal distortion caused by nonlinear optical effects over the entire all-optical transmission line 10. The system nonlinear phase shift, $\phi_{sys}$, is a selected upper limit on the cumulative nonlinear optical phase shift, $\phi_{NL}$, e.g., $\phi_{sys} \geq \phi_{NL}$. Above, sums are over all the N spans $SP_1, \ldots, SP_N$ in the all-optical transmission line 10.

Both OCOP and OVOP embodiments of all-optical transmission line 10 configure the optical amplifiers $OA_0, \ldots, OA_N$ to produce average optical launch powers that approximately maximize $OSNR_{Del}$ while simultaneously constraining $\phi_{NL}$.

In OCOP embodiments, each optical amplifier $OA_0, \ldots$ is configured to produce substantially the same time-averaged and channel-averaged, per-channel, optical power, $P_{sys}$, for launching optical pulses into the spans' optical fibers $OF_1, \ldots, OF_N$. From the above formulas, the delivered OSNR and cumulative nonlinear optical phase shift are approximately:

$$OSNR_{Del} = P_{sys} \left[\sum_{j=1}^{N} hvB_{ref}F_j/T_j\right]^{-1}, \text{ and}$$

$$\phi_{NL} = P_{sys}\sum_{j=1}^{N} \gamma_j[1 - T_j]/\alpha_j,$$

respectively.

Solutions of the above equations provide the values of $P_{sys}$ and $OSNR_{Del}$ in the OCOP embodiments. Such solutions typically exist for an $OSNR_{Del}$ greater than a selected minimum value if the number of spans, N, is small enough.

The OCOP equations simplify for homogeneous embodiments of the optical transmission line 10. In these embodiments, all spans have the same type of optical transmission fiber and all optical amplifiers are of the same type. Thus, the span and amplifier properties $\alpha_j, \gamma_j, T_j$, and $F_j$ take the respective span-independent values $\alpha, \gamma, T$, and F. In such homogeneous OCOP embodiments, each span $Sp_j$ will be configured to have an average optical launch power substantially equal to $P_{sys}$, wherein $P_{sys} = \phi_{NL} \cdot \alpha/[N \cdot \gamma \cdot (1-T)] \cong \phi_{NL} \cdot \alpha/[N \cdot \gamma]$. The last approximate relation follows, because the fibers' transmissivity, T, is typically very small compared to one, e.g., less than about 0.05.

Substantially OCOP embodiments provide other embodiments of all-optical transmission line 10. In such embodiments, some average optical launch powers may differ from the value of $P_{sys}$ for two reasons. First, in heterogeneous embodiments, the exact equation for $\phi_{NL}$ receives only small contributions from spans in which average optical launch powers are very low, e.g., ones of the spans $SP_1, \ldots, SP_N$ with low losses in the associated passive optical transmission fibers $OF_1, \ldots, OF_N$. Thus, the special spans $SP_1, \ldots SP_N$ that average launch optical power into the highest loss ones of the fibers $OF_1, \ldots, OF_N$ may be the only spans that need provide average optical launch powers substantially equal to $P_{sys}$. The optical amplifiers $OA_0, \ldots, OA_N$ that launch optical signals into lower loss ones of the fibers $OF_1, OF_N$ may, e.g., be configured to produce significantly lower average optical launch powers. The highest loss ones of the optical transmission fibers may, e.g., have losses within 6 dB or within 9 dB of the loss of the highest loss one of the optical transmission fiber $OF_1, \ldots, OF_N$. An all-optical transmission line 10 may have five or more or even ten or more of the special spans with the highest loss ones of the optical transmission fibers. Second, in homogeneous and heterogeneous OCOP embodiments, the substantially equal average optical launch powers may also be distributed over the interval of $P_{sys \pm} 2$ dB, i.e., $[0.63 P_{sys}, 1.58 P_{sys}]$ or over the smaller interval of $P_{sys} \pm 1$ dB, i.e., $[0.79P_{sys}, 1.26P_{sys}]$. Any combination of the above-described variations provides a substantially OCOP embodiment with potentially advantageous properties.

In OVOP embodiments, the optical amplifiers $OA_0, \ldots OA_N$ are configured to produce average optical launch powers $P_1, \ldots, P_N$ that may vary from span-to-span. In the OVOP embodiments, determining the average optical launch power vector, P, involves minimizing $OSNR_{Del}$ subject to a constraint that the cumulative nonlinear optical phase shift, $\phi_{NL}$, is equal to the preselected system value $\phi_{sys}$, e.g., $\phi_{sys}=1$ radian. Such a constrained minimization may be performed by finding the minimum of a function $L(P, \lambda)$ that depends on a Lagrange multiplier $\lambda$. In particular, $L(P, \lambda)$ is given by:

$$L(P, \lambda) = hvB_{Ref}\sum_{j=1}^{N} F_j/(T_jP_j) + \lambda\left[\sum_{j=1}^{N} \frac{\gamma_j}{\alpha_j}P_j(1-T_j) - \phi_{sys}\right].$$

The Lagrange multiplier, $\lambda$, imposes the constraint $\phi_{NL}=\phi_{sys}$ when the function $L(P, \lambda)$ is minimized with respect to $\lambda$. Nevertheless, it is more convenient to minimize $L(P, \lambda)$ by first finding its extrema with respect to the average optical launch powers, i.e., by requiring that $\partial L(P,\lambda)/\partial P_j=0$ for all spans "j". Afterwards, the extrema equations provide a value for the Lagrange multiplier $\lambda$. In particular, the extrema equations become:

$$\lambda = \frac{hvB_{Ref}F_j\alpha_j}{\gamma_j(P_j)^2T_j(1-T_j)} = \frac{1}{OSNR_j \cdot \phi^j_{NL}} = \frac{1}{OSNR_{Del} \cdot \phi_{NL}}.$$

Each span's quality product is defined by the product $OSNR_j \cdot \phi_{NL}^j$. In an OVOP embodiment, the spans' quality products are substantially equal to $OSNR_{Del} \cdot \phi_{NL}$ for substantially all spans of the all-optical transmission line 10. In particular, the spans' quality products may be distributed over the interval $[0.63 \cdot OSNR_{Del} \cdot \phi_{NL}, 1.58 \cdot OSNR_{Del} \cdot \phi_{NL}]$ or over the smaller interval $[0.79 \cdot OSNR_{Del} \cdot \phi_{NL}, 1.26 \cdot OSNR_{Del} \cdot \phi_{NL}]$.

Minimizing the function $L(P, \lambda)$ also provides expressions for the average optical launch powers $\{P_1, \ldots, P_N\}$ and the multiplier, $\lambda$, in terms of span properties and the system's cumulative nonlinear phase shift, $\phi_{sys}$, as follows:

$$P_j = \phi_{sys} \sqrt{\frac{F_j \alpha_j}{\gamma_j T_j (1 - T_j)}} \left[ \sum_{i=1}^{N} \sqrt{\frac{F_i \gamma_i (1 - T_i)}{\alpha_i T_i}} \right]^{-1}, \text{ and}$$

$$\lambda = \frac{h \nu B_{Ref}}{(\phi_{sys})^2} \left[ \sum_{j=1}^{N} \sqrt{\frac{F_i \gamma_i (1 - T_i)}{\alpha_j T_j}} \right]^2.$$

The above expression describes how to configure optical amplifiers $OA_0, \ldots, OA_N$ to produce the OVOP embodiments of the all-optical transmission line 10.

In some OVOP embodiments, all spans $SP_1, \ldots, SP_N$ use the same type of optical transmission fiber and the optical amplifiers $OA_0, OA_1, \ldots, OA_N$ of the line 10 are also of the same type. Then, the OVOP expressions for the $P_j$'s simplify. In particular, $(\alpha_j, \gamma_j) = (\alpha, \gamma)$ for each span $SP_j$, and $F_j = F$ for each amplifier $OA_j$ of such an embodiment. Assuming also that the $T_j$'s are small compared to one, the OVOP expressions for the $P_j$'s of these embodiments become the constraints:

$$P_j - \frac{\Gamma_j}{2} = P_{average} - \frac{\Gamma_{average}}{2}.$$

Here, $P_{average}$ and $\Gamma_{average}$ are averages of $P_j$ and $\Gamma_j$, respectively, over the spans $SP_1, \ldots, SP_N$ of the all-optical transmission line 10, i.e., $P_{average} = P_j$ and $\Gamma_{average} = \Sigma_j \Gamma_j / N$.

Figure 2:
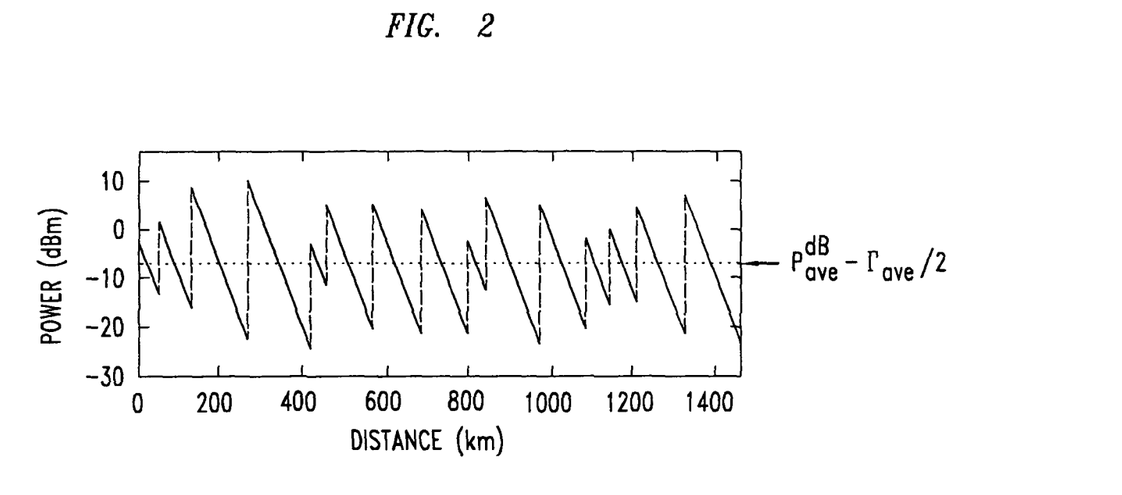
FIG. 2 illustrates the optical power evolution in one OVOP embodiment of a heterogeneous all-optical fiber transmission line according to FIG. 1.

FIG. 2 illustrates an interpretation of the above-stated constraints on $P_j - \Sigma_j \Gamma_j / 2$. The constraints are equivalent to the average launch optical power plus the time-averaged and channel-averaged delivered optical power being substantially equal to $(2 P_{average} - \Gamma_{average})$ for each span $SP_1, \ldots, SP_N$ in the all-optical transmission line 10. For the various spans $SP_1, \ldots, SP_N$, the sums may be distributed over the interval of $(2 P_{average} - \Gamma_{average}) \pm 2$ dB, i.e., $[0.63 \cdot (2 P_{average} - \Gamma_{average}), 1.58 \cdot (2 P_{average} - \Gamma_{average})]$ or may be distributed over the smaller interval of $(2 P_{average} - \Gamma_{average}) \pm 1$ dB, i.e., $[0.79 \cdot (2 P_{average} - \Gamma_{average}), 1.26 \cdot (2 P_{average} - \Gamma_{average})]$.

Substantially OVOP embodiments of heterogeneous all-optical transmission line 10 only impose the above-recited conditions on a proper subset of the spans $SP_1, \ldots, SP_N$. In particular, the conditions may be imposed on only the special spans in which the optical transmission fibers $OF_1, \ldots, OF_N$ have the highest losses. For example, the special spans may include spans with an optical transmission fiber whose loss is within 6 dB or within 9 dB of the loss of the highest loss transmission fiber fibers $OF_1, \ldots, OF_N$. Then, $P_{average}$ and $\Gamma_{average}$ may be averages over the subset composed of these highest loss optical fibers. A substantially OVOP embodiment of the all-optical transmission line may have at least five of such special spans with highest loss fibers or may have ten or more of such special spans.

To evaluate relative performances, a simulation was performed to compare a distribution of optical transmission lines configured according to the FOP, OCOP, and OVOP methods.

Each optical transmission line was constructed by selecting a sequence of total span losses, i.e., $\Gamma_1, \Gamma_2, \Gamma_3, \ldots$, in a pseudo-random manner. In the simulated lines, optical amplifiers had 6 dB noise figures, and optical transmission fibers had span loss coefficients of 0.2 dB per kilometer and nonlinear optical coefficients of 1.27 per watt-kilometer. In the simulated lines, the FOP method configured the average optical launch powers to 3.0635 dBm. These values were found by optimizing a reference homogeneous optical transmission line with 18 spans of 100 km long optical transmission fibers and per-span losses of 20 dB. In the simulations, the OCOP and OVOP methods configured average optical launch powers as already described and neglected inter-span connector losses.

Figure 3:
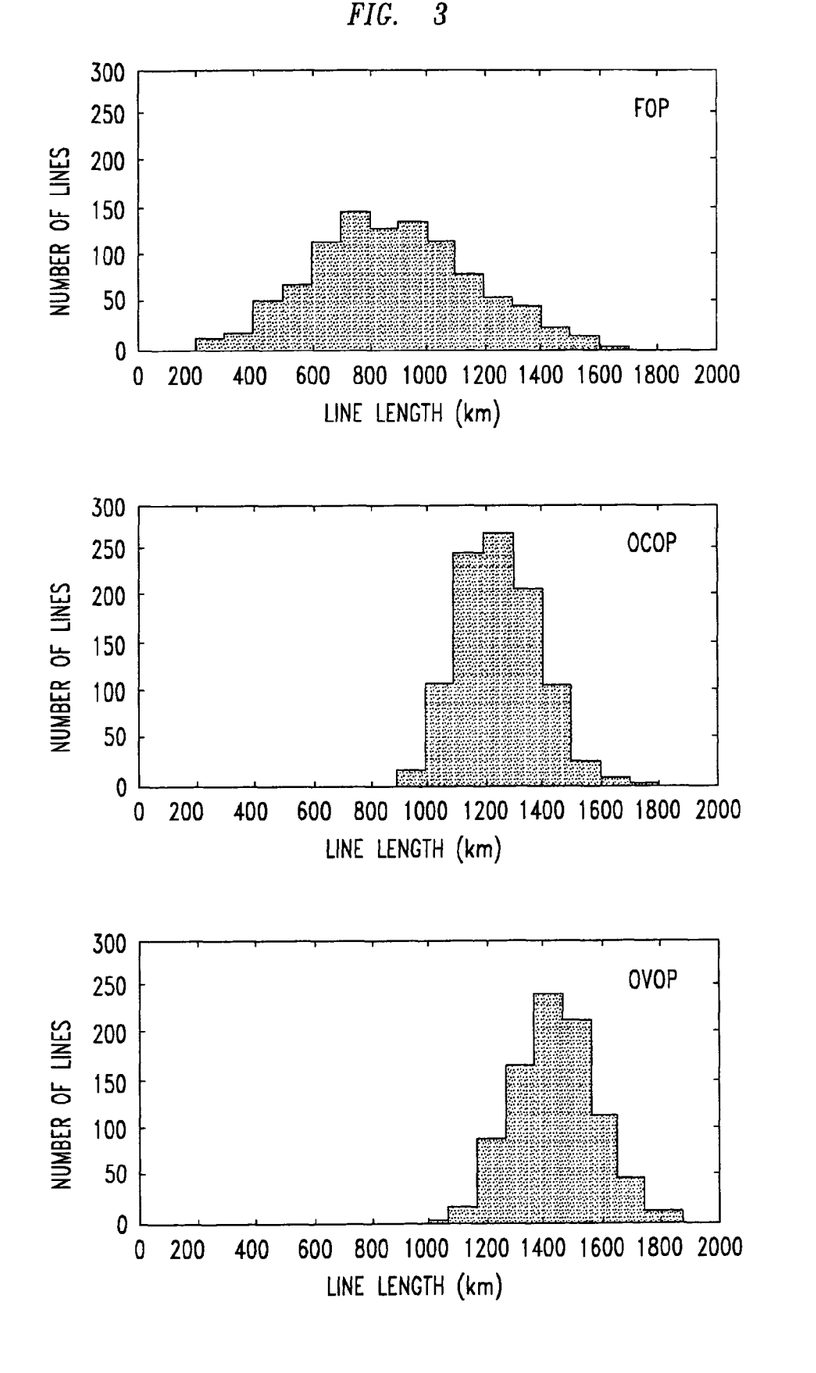
FIGS. 3 and 4 plot distributions of maximum reaches for simulated random distributions of spans in optical transmission lines where the optical powers evolve according to fixed output power (FOP), OCOP, and OVOP formats.
Figure 4:
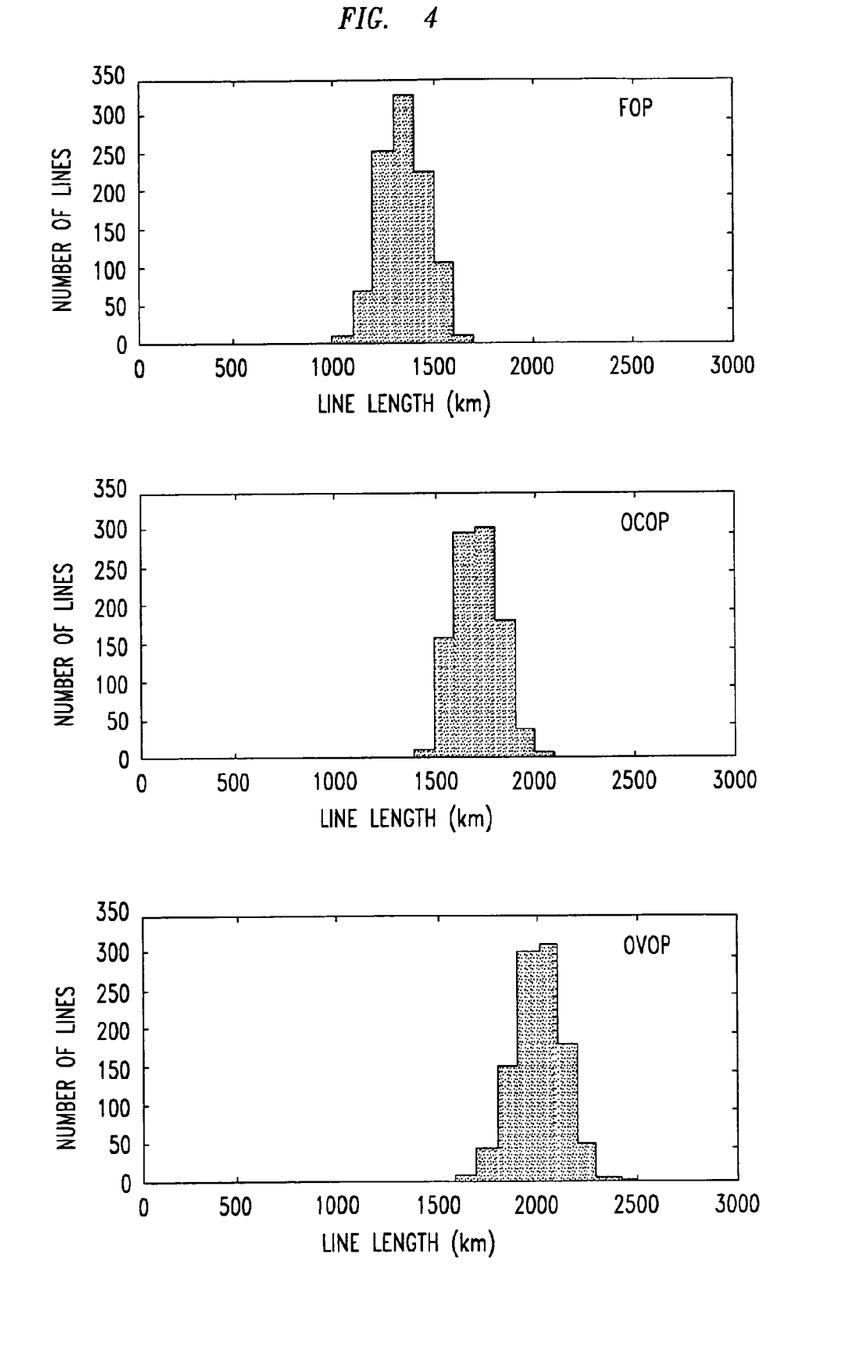

FIGS. 3 and 4 plot maximum reaches of two sets of 1,000 simulated optical transmission lines. The loss distributions were between 13 dB and 33 dB for the spans' passive optical transmission fibers in FIG. 3 and were between 8 dB and 28 dB for the spans' passive optical transmission fibers in FIG. 4. Maximum reaches were defined as the lengths of the sequences of spans for which $OSNR_{Del} \geq 19$ dB and $\phi_{NL} \leq 1$ radian.

In both FIGS. 3 and 4, the simulated optical transmission lines appear to have substantially larger maximum reaches when configured according to the OCOP method rather than according to the FOP method. Indeed for both distributions of optical transmission lines, peak values of maximum reaches appear to be 20-40% larger when the average optical launch powers are configured according to the OCOP method.

In both FIGS. 3 and 4, the simulated optical transmission lines appear to have even larger maximum reaches when configured according to the OVOP method rather than according to the OCOP method. Both loss distributions for the spans' passive optical transmission fibers produce peak values of maximum reaches that appear to be at least 40% larger when the average optical launch powers are configured according to the OVOP method rather than according to the FOP method.

FIGS. 3 and 4 show that many heterogeneous optical transmission lines will need less OEO conversions when configured according to the OVOP or OCOP methods than when configured according to the FOP method. Thus, using the OVOP or OCOP methods to adjust optical power evolutions in deployed metro and regional optical transmission lines should significantly reduce the need for costly OEO converters therein.

Figure 5A:
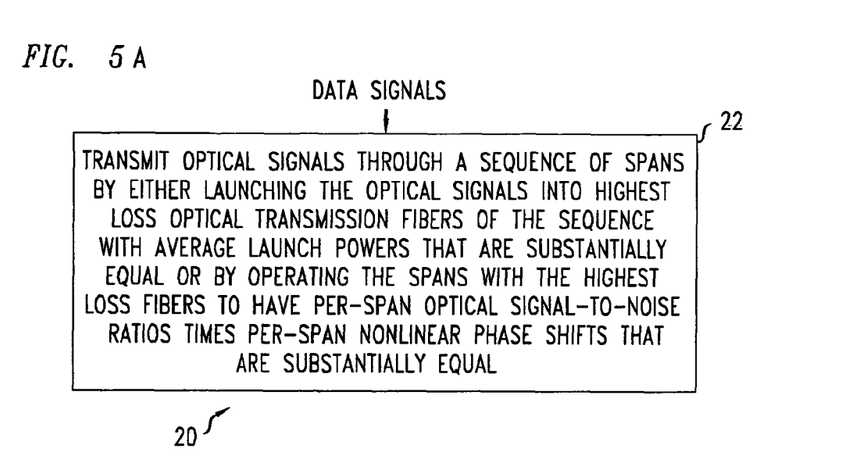
FIGS. 5A-5C illustrate various methods of operating sequences of spans of all-optical fiber transmission lines.

FIG. 5A illustrates a method 20 of operating an all-optical fiber transmission line, e.g., an embodiment of the line 10 of FIG. 1, to transmit a stream of data. The method 20 includes transmitting optical signals through a heterogeneous sequence of spans of the all-optical fiber transmission line (step 22). The transmitting step includes either launching the optical signals into highest loss passive optical transmission fibers of the sequence with average optical launch powers that are substantially equal to a special sum or operating the spans with the highest loss passive optical transmission fibers to have substantially equal quality products. Here, each average optical launch power is the time-average and channel-average of the optical launch power in the associated span. The special sum adds $(1-T_j)\Gamma_j / [\phi_{NL} \cdot \alpha_j]$ over the highest loss ones of the passive optical transmission fibers. Each quality product is the per-span optical signal-to-noise ratio of the associated span times the nonlinear phase shift of the associated span. For example, five or more of the spans of the sequence may have one of the highest loss passive optical transmission fibers. The method 20 may, e.g., implement the above-described substantially OCOP format or the above-described substantially OVOP format.

Figure 5B:
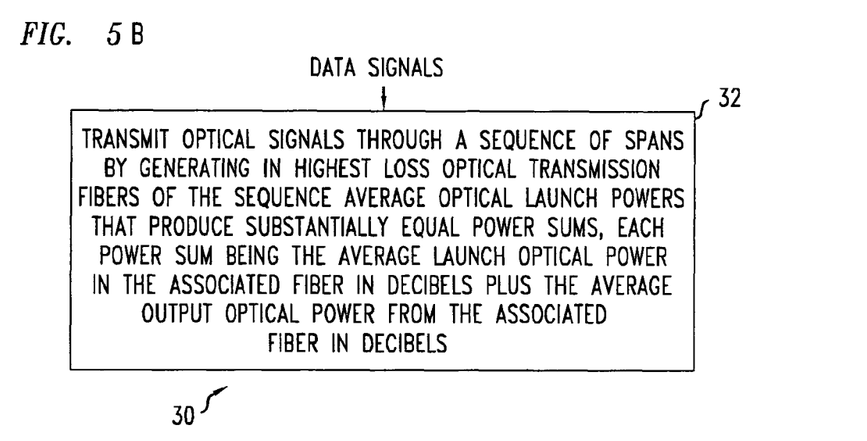

FIG. 5B illustrates another method 30 of operating an all-optical fiber transmission line, e.g., an embodiment of the line 10 of FIG. 1, to transmit a stream of data. The method 30 includes transmitting optical signals through a heterogeneous sequence of spans of the line (step 32). The transmitting step includes generating in highest loss passive optical transmission fibers of the sequence average optical launch powers that produce substantially equal power sums. Here, each average optical launch power is the time-average and channel-average of the launch power in the associated span. For each span, the power sum is the average launch optical power in the associated passive optical transmission fiber plus the average delivered optical power from the associated passive optical transmission fiber. Five or more of the spans may have one of the highest loss passive optical transmission fibers. The method 30 may, e.g., use a substantially OVOP format as already described.

Figure 5C:
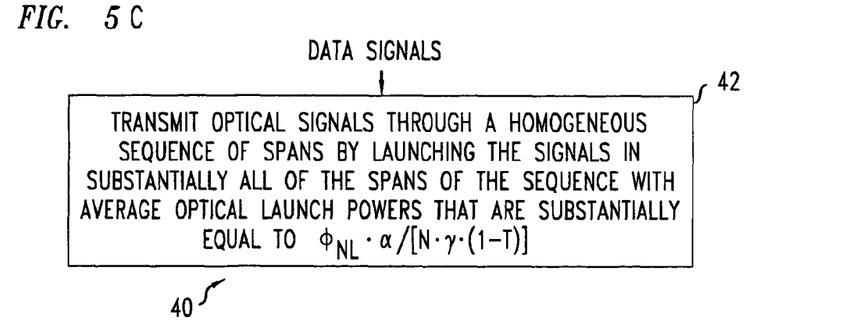

FIG. 5C illustrates another method 40 of operating a homogeneous all-optical fiber transmission line, e.g., an embodiment of the line 10 of FIG. 1, to transmit a stream of data. The method 40 includes transmitting optical signals through a homogeneous sequence of N spans of the line (step 42). The transmitting step includes launching the optical signals in substantially all of the passive optical transmission fibers of the spans of the sequence with average optical launch powers that are substantially equal to $\phi_{NL} \cdot \alpha / [N \cdot \gamma \cdot (1-T)]$. For example, substantially all of the spans may include 70% or more, 80% or more, 90% or more, or all of the spans. Here, the average optical launch power is the time-average and channel-average of the launch power in the passive optical transmission fiber of the span. The parameters T, γ, and α are the respective transmissivity, nonlinear coefficient, and loss coefficient of the fibers. The method 30 may, e.g., use a substantially OCOP format as already described.

From the above disclosure, the figures, and the claims, other embodiments will be apparent to those of skill in the art.

What we claim is:

1. A method, comprising:
    transmitting optical signals through a heterogeneous sequence of optical fiber transmission spans of an all-optical transmission line, each span having an associated optical transmission fiber connected to an associated optical amplifier, each amplifier being connected to launch the optical signals into a remainder of the all-optical transmission line; and
    wherein the transmitting comprises generating, in the optical transmission fibers of the heterogeneous sequence having highest losses, average optical launch powers that produce substantially equal power sums, the power sum of each span being the average optical launch power into the associated optical transmission fiber plus the average optical power delivered from the associated optical transmission fiber.

2. The method of claim 1, Wherein each power sum is substantially equal to $2 P_{average} - \Gamma_{average}$, $P_{average}$ being an average over the heterogeneous sequence of the average launch power of each of the optical transmission fibers, and $\Gamma_{average}$ being an average over the heterogeneous sequence of an optical loss of each of the optical transmission fibers.

3. The method of claim 1, wherein each power sum is in the interval $[0.63 \cdot (2 P_{average} - \Gamma_{average}), 1.58 \cdot (2 P_{average} - \Gamma_{average})]$, $P_{average}$ being an average over the heterogeneous sequence of the average launch power of each of the optical transmission fibers, and $\sigma_{average}$ being an average over the heterogeneous sequence of an optical loss of each of the optical transmission fibers.

4. The method of claim 1, wherein each power sum is in the interval $[0.79 \cdot (2 P_{average} - \Gamma_{average}), 1.26 \cdot (2 P_{average} - \Gamma_{average})]$, $P_{average}$ being an average over the heterogeneous sequence of the average launch power of each of the optical transmission fibers, and $\Gamma_{average}$ being an average over the heterogeneous sequence of an optical loss of each of the optical transmission fibers.

5. The method of claim 1, wherein the optical transmission fibers of the heterogeneous sequence having highest losses include the optical transmission fibers whose losses are, within 6 decibels of the one of the optical transmission fibers having the highest loss.

6. The method of claim 1, wherein the optical transmission fibers of the heterogeneous sequence having highest losses include the optical transmission fibers of at least five of the spans.

7. The method of claim 1, wherein the optical transmission fibers of the heterogeneous sequence having highest losses have substantially equal loss coefficients and have substantially equal nonlinear optical coefficients.

\* \* \* \* \*